United States Patent [19]
Steinle

[11] Patent Number: 6,080,980
[45] Date of Patent: Jun. 27, 2000

[54] OPTICS FOR REDUCING ONE DIMENSION OF A FOLDED OPTICAL PATH

[75] Inventor: Michael J. Steinle, Fort Collins, Colo.

[73] Assignee: Hewlett-Packard Company, Palo Alto, Calif.

[21] Appl. No.: 09/026,069

[22] Filed: Feb. 18, 1998

[51] Int. Cl.[7] .................................................. G02B 5/30
[52] U.S. Cl. ..................... 250/216; 359/497; 359/500; 250/225
[58] Field of Search ..................... 250/216, 225; 359/500, 497, 487, 494, 495, 483

[56] References Cited

U.S. PATENT DOCUMENTS

| | | | |
|---|---|---|---|
| 5,610,765 | 3/1997 | Colucci | 359/497 |
| 5,731,886 | 3/1998 | Taber et al. | 359/65 |
| 5,751,480 | 5/1998 | Kitagishi | 359/497 |
| 5,882,774 | 3/1999 | Jonza et al. | 428/212 |
| 5,900,976 | 5/1999 | Handschy et al. | 359/497 |
| 5,900,977 | 5/1999 | Hikmet | 359/497 |
| 5,940,149 | 8/1999 | Vanderwerf | 349/5 |

*Primary Examiner*—John R Lee
*Attorney, Agent, or Firm*—Augustus W. Winfield

[57] ABSTRACT

An optical system that folds a light path multiple times with all the folded paths being coplanar. The light is first polarized. Then, the polarized light is reflected multiple times through a quarter-wave plate, finally being phase shifted to the proper polarization state to enable transmission out of the system. One optical element transmits light that is at one planar polarity and reflects light at the orthogonal planar polarity. Another optical element transmits light that is at one circular polarity and reflects light at the orthogonal circular polarity.

7 Claims, 2 Drawing Sheets

OPTICS FOR REDUCING ONE DIMENSION OF A FOLDED OPTICAL PATH

FIELD OF INVENTION

This invention relates generally to optics used to fold an optical path with particular applicability to optics used in copiers and optical image scanners.

BACKGROUND OF THE INVENTION

In many optical systems, the optical path between two lenses or the optical path between an object and an image is folded to reduce a dimension of a mechanical enclosure. For example, binoculars commonly use a pair of prisms to fold the optical path between two lenses to reduce the overall device length (and also to provide an upright image). Some telescopes, copiers, and optical image scanners also reduce a device dimension by incorporating mirrors, prisms, and other optical components to fold an optical path back and forth within the device.

FIG. 1A illustrates an example folded optical path in a prior art optical image scanner. A lens 100 focuses a single line from a document 102 onto an image at a sensor array 104. Light from the document is reflected from a first mirror 106, a second mirror 108 and third mirror 110 before entering the lens 100. If length is defined as a dimension parallel to segment 118, then the system shown reduces the length of the system. However, the reduction in length comes at the expense of increasing the orthogonal dimension labeled as "D" (120) in FIG. 1. Mirror 110 must be non-perpendicular to segment 118 and mirror 108 must be non-perpendicular to segment 114. Stated alternatively, path segments 114, 116, and 118 cannot be coplanar. Similarly, binoculars often decrease the length of the binoculars as measured along the sight path from the eyes of the human observer, at the expense of making at least part of the binoculars substantially wider than the spacing of human eyes.

FIG. 1B illustrates a top view of the optical system of FIG. 1A. FIG. 1B illustrates that light rays forming an image at sensor 104 converge through the center of lens 100.

In the case of scanners and copiers, there is an ongoing need to make the products smaller. In particular, there is a need to make the optical systems smaller, lighter and lower cost. Typically, the optics shown in FIG. 1 are contained within a moveable carriage. Reducing the size of the carriage enables a reduced product height, and reduces the weight of the carriage which in turn enables use of smaller, lower cost motors for moving the carriage and lighter supporting structures to hold the carriage. There is a need for a folded optical system that reduces the length of the system without increasing a dimension orthogonal to the length.

SUMMARY OF THE INVENTION

In two example embodiments, a system is provided in which a light ray is folded approximately into thirds, with all of the three longer optical path segments being coplanar. The system takes advantage of materials that can transmit one light polarization state while reflecting another. The light is first polarized. Then, the light is reflected twice and phase shifted by a quarter-wave plate after each reflection. After being phase shifted by the quarter-wave plate twice, the light is phase shifted to a polarity that enables transmission through the final element.

DETAILED DESCRIPTION OF THE PREFERRED EMBODIMENT OF THE INVENTION

In a simplified wave model of natural light, the light is treated as a transverse electromagnetic wave with a rapidly varying succession of different polarization states. For each polarization state, the electric field vector may be modeled as rotating around the direction of propagation and changing magnitude, tracing out an ellipse in a fixed space perpendicular to the direction of propagation. Special cases of the elliptical model result in tracing out a straight line (linear polarized or plane polarized) or tracing out an ellipse (circular polarized). There are two possible orthogonal linear polarization lines and two possible directions of rotation for circular polarization. In this patent document, the two orthogonal linear polarization states will be referred to as "s" and "p" and the two orthogonal circular polarization states will be referred to as RHC (right-hand-circular) and LHC (left-hand-circular). The states are ordered in quarter-wave increments as follows: s - RHC - p - LHC, and repeating.

Ideal polarizing filters transmit one polarization state and block the orthogonal state. In the following discussion, filters and other optical elements will be described as transmitting one polarization state and reflecting the orthogonal state but in general, there are no ideal elements transmitting or reflecting a single state. Instead, in general, the optical elements have some degree of asymmetry in that one polarization state is transmitted more than the orthogonal state or one polarization state is reflected more than the orthogonal state. Similarly, one element is described as a quarter-wave plate. An ideal quarter-wave plate retards light by a fixed linear retardation, which for light at a particular wavelength will correspond to a retardation of phase by 90 degrees. In a system with light over a broad spectrum, a quarter-wave plate retards the phase of one wavelength within the light spectrum by 90 degrees and other wavelengths are phase retarded slightly more or less than 90 degrees, depending on wavelength.

Figure 1A:
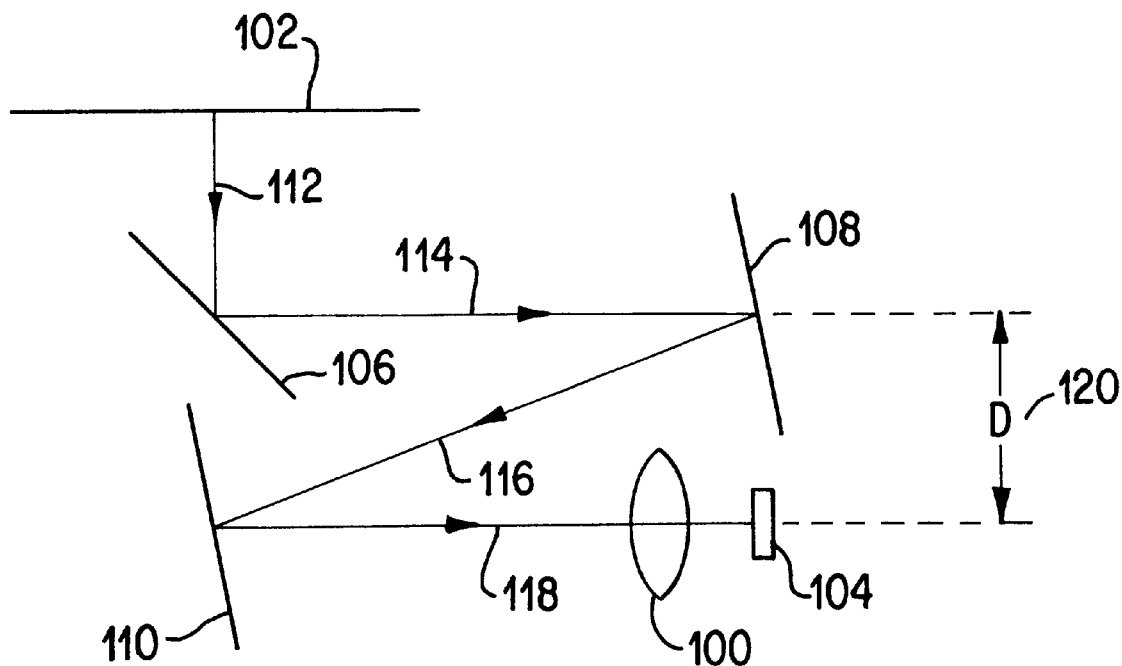
FIG. 1A (prior art) is a side view of an optical system in an image scanner.
Figure 1B:
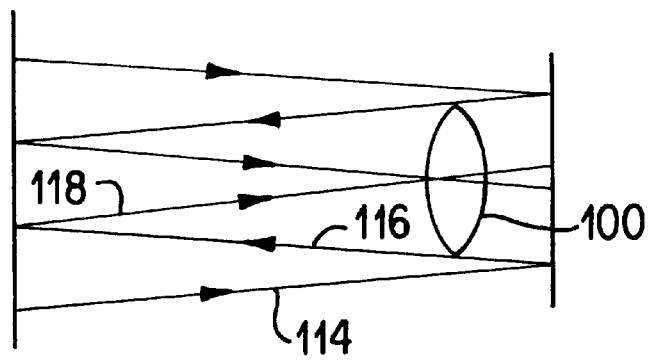
FIG. 1B (prior art) is a top view of the optical system of FIG. 1A.
Figure 2:
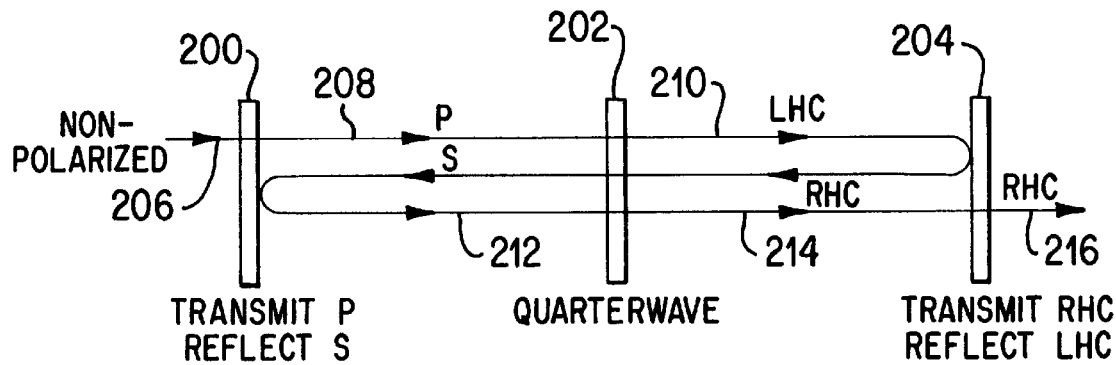
FIG. 2 is a side view of an optical system in accordance with an example embodiment of the invention.

FIG. 2 illustrates a first example embodiment of the invention. There are three optical elements as follows. Element 200 transmits p-polarized light and reflects s-polarized light. Element 202 is a quarter-wave plate, converting p-polarized light to LHC polarized light and so forth in the order discussed above. Element 204 transmits RHC polarized light and reflects LHC polarized light. Non-polarized light 206 enters the system. Element 200 partially polarizes the light by transmitting p-polarized light 208. Quarter-wave plate 202 phase shifts the p-polarized light to LHC polarized light 210. The LHC polarized light 210 is reflected from element 204 which transmits RHC polarized light and reflects LHC polarized light. Quarter-wave plate 102 phase shifts the LHC polarized light to s-polarized light 212. The s-polarized light 212 is reflected from element 200 which transmits p-polarized light and reflects s-polarized light. Quarter-wave plate 202 phase shifts the s-polarized light 212 to RHC polarized light 214. Element 204 transmits the RHC polarized light (output 116). Light rays 208, 210, 212 and 214 are shown as displaced for simplicity of illustration but they are actually all coplanar. Note that light rays 208, 210, 212 and 214 in FIG. 2 are coplanar when viewed as in FIG. 2 but are not coincident when viewed orthogonally as in FIG. 1B. Elements 200, 202 and 204 are illustrated as separated for simplicity of illustration but elements 200 and 202 could be combined as a single sandwiched assembly or elements 202 and 204 could be combined as a single sandwiched assembly.

Figure 3:
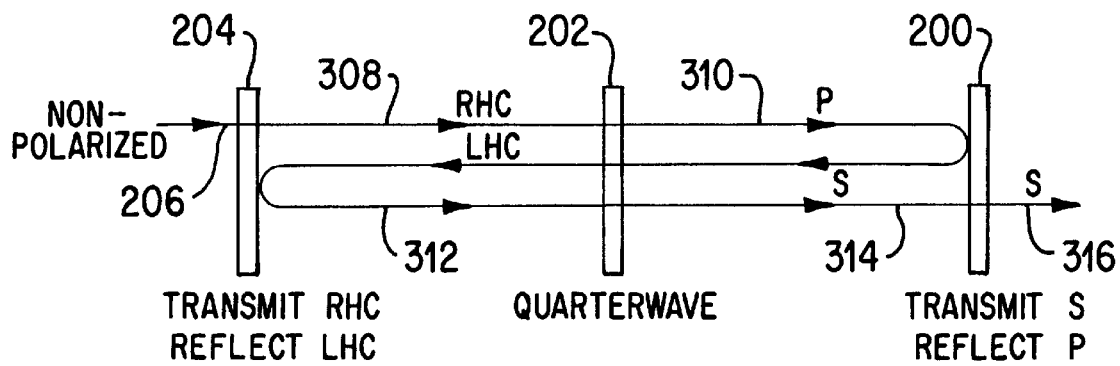
FIG. 3 is a side view of an optical system having a alternative arrangement of the components of FIG. 2.

The location of elements 204 and 200 in FIG. 2 may be reversed. FIG. 3 illustrates an embodiment with elements 204 and 200 in reversed. In FIG. 2, element 200 was described as transmitting p-polarized light and reflecting s-polarized light. Element 200 can be configured for an opposite effect by rotating the element 90 degrees (with the light path through the center of the element being the axis of rotation). Accordingly, in FIG. 3, element 200 transmits s-polarized light and reflects p-polarized light. In FIG. 3, non-polarized light enters element 204 where only RHC-polarized light 308 is transmitted. The RHC-polarized light 308 is phase shifted by quarter-wave plate 202 exiting as p-polarized light 310. The p-polarized light 310 is reflected by element 200 which reflects p-polarized light and transmits s-polarized light. Reflected p-polarized light 310 is phase shifted by quarter-wave plate 202 exiting as LHC-polarized light 312. The LHC-polarized light 312 is reflected by element 204. Reflected LHC-polarized light 312 is phase shifted by quarter-wave plate 202, exiting as s-polarized light 314. The s-polarized light 314 is transmitted by element 200 so that s-polarized light 316 exits the system. Light rays 308, 310, 312 and 314 are shown as displaced for simplicity of illustration but they are actually all coplanar. Note that light rays 308, 310, 312 and 314 in FIG. 3 are coplanar when viewed as in FIG. 3 but are not coincident when viewed orthogonally as in FIG. 1B. Elements 200, 202 and 204 are illustrated as separated for simplicity of illustration but elements 200 and 202 could be combined as a single sandwiched assembly or elements 202 and 204 could be combined as a single sandwiched assembly.

An example material suitable for element 200 is commercially available as 3M DBEF (Dual Brightness Enhancement Film) from Minnesota Mining and Manufacturing Company (3M). An example material suitable for element 204 is commercially available as the Cholesteric Polarizer from Merck Japan Limited.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An optical system comprising:

a first optical element that transmits light having a first polarity and reflects a polarity that is orthogonal to the first polarity;

a second optical element that transmits light having a second polarity and reflects a polarity that is orthogonal to the second polarity, the second polarity being phase retarded by 90 degrees relative to the first polarity;

a quarter-wave plate mounted between the first optical element and the second optical element;

wherein the first optical element, the quarter-wave plate and the second optical element are all parallel and are all perpendicular to a plane; and wherein at least one light ray in the plane is transmitted through the first optical element, is reflected from the second element, is reflected from the first element, and then transmitted by the second optical element.

2. The optical system of claim 1 wherein the first optical element transmits light having a first planar polarity and reflects light having a planar polarity that is orthogonal to the first planar polarity.

3. The optical system of claim 1 wherein the first optical element transmits light having a first circular polarity and reflects light having a circular polarity that is orthogonal to the first circular polarity.

4. The optical system of claim 1 wherein the quarter-wave plate and the first optical element are touching and the second optical element is displaced from the quarter-wave plate.

5. The optical system of claim 1 wherein the quarter-wave plate and the second optical element are touching and the first optical element is displaced from the quarter-wave plate.

6. A method of folding a light path, the method comprising the following steps:

transmitting light, that is polarized, in a plane;

changing the polarity of the light by retarding the phase by 90 degrees;

reflecting, by an optical element, the light, in the plane;

changing the polarity of the light by retarding the phase by 90 degrees;

reflecting the light, in the plane; and transmitting, by the optical element, the light, in the plane.

7. An optical system comprising:

a plurality of optical elements having only flat optical surfaces;

wherein a centerline of light rays entering the optical system is coincident with a centerline of light rays exiting the optical system; and wherein a centerline of light rays through the optical system is folded by the flat optical surfaces, with the centerline of each fold coincident.

* * * * *